United States Patent [19]

Hung

[11] Patent Number: 5,364,606

[45] Date of Patent: Nov. 15, 1994

[54] NOX REDUCTION THROUGH THE USE OF METHANE

[75] Inventor: Stephen L. Hung, Clifton Park, N.Y.

[73] Assignee: General Electric Company, Schenectady, N.Y.

[21] Appl. No.: 24,049

[22] Filed: Mar. 1, 1993

[51] Int. Cl.$^5$ .................. C01B 21/04; F01N 3/10; B01D 53/34

[52] U.S. Cl. ................ 423/239.2; 422/172; 422/173

[58] Field of Search .............. 423/236, 239.1, 245.3, 423/239.2; 422/172, 173; 502/60

[56] References Cited

U.S. PATENT DOCUMENTS

| 4,774,060 | 9/1988 | Voss et al. ............... 422/173 |
| 4,830,833 | 5/1989 | Shaff ....................... 422/172 |
| 5,149,512 | 9/1992 | Li et al. ................... 423/239 |

FOREIGN PATENT DOCUMENTS

| 0067172 | 6/1977 | Japan ............... 423/236 |
| 0080848 | 4/1988 | Japan ............... 423/245.3 |
| 2238784 | 6/1991 | United Kingdom ... 423/239.2 |
| 0458251 | 7/1977 | U.S.S.R. ............ 423/245.3 |

OTHER PUBLICATIONS

"Selective Reduction of NO with Propylene on Fe-silicate Catalysts", by E. Kikuchi et al., Chemistry Letters, 1991, pp. 1063–1066.

"Sulfate-promoted Metal Oxide Catalysts for the Selective Reduction of Nitrogen Monoxide by Propane in Oxygen-rich Atmosphere", by H. Y. Hamada et al., Chemistry Letters, 1991, pp. 2179–2182.

"Cu-ZSM-5 Zeolite as Highly Active Catalysts for Removal of Nitrogen Monoxide from Emission of Diesel Engines", by S. Y. Sato, Applied Catalysis, vol. 70, 1991, pp. L1–L5.

"Highly selective Reduction of Nitrogen Oxides with Hydrocarbons over H-form Zeolite Catalysts in Oxygen-Rich Atmospheres", by H. Y. Hamada et al., Applied Catalysis, vol. 64, 1990, pp. L1–L4.

"Selective Reduction of Nitrogen Oxides with Hydrocarbons over Solid Acid Catalysts in Oxygen-Rich Atmospheres", by Y. H. Kintaichi et al., Catalysis Letters, vol. 6, 1990, pp. 239–244.

"Catalytic Removal of Nitrogen Monoxide over Rare Earth Ion-Exchanged Zeolites in the Presence of Propene and Oxygen", by M. Misono, et al., Chemistry Letters, 1991, pp. 1001–1002.

Primary Examiner—Carl F. Dees
Attorney, Agent, or Firm—Patrick R. Scanlon; Paul R. Webb, II

[57] ABSTRACT

This invention relates to the catalytic reduction of nitrogen monoxide (NO) from highly oxidizing environments. Such catalytic reductions of this type employ the use of small quantities of methane ($CH_4$) to provide a selective catalytic reduction (SCR) of the NO.

7 Claims, 4 Drawing Sheets

NOX REDUCTION THROUGH THE USE OF METHANE

BACKGROUND OF THE INVENTION

1. Field of the Invention

This invention relates to the catalytic reduction of nitrogen monoxide (NO) from highly oxidizing environments. Such catalytic reductions of this type employ the use of small quantities of methane ($CH_4$) to provide a selective catalytic reduction (SCR) of the NO.

2. Description of the Related Art

Although the catalytic reduction of nitrogen oxide (NO) by hydrocarbons, carbon monoxide (CO), carbon (C), and hydrogen ($H_2$) have been reported under oxidative conditions, the selective catalytic reduction (SCR) process is the only commercially proven process where NO can be selectively reduced (instead of $O_2$) under the highly oxidative conditions typically from stationary combustion sources whose exhaust temperature is usually less than 1200° F. Although SCR is a proven commercial process for the reduction of nitrogen oxides (NO and $NO_2$) from highly oxidizing environments, it requires the use of ammonia ($NH_3$) as the reducing species.

Using ammonia as a reducing agent has several disadvantages:

(1) $NH_3$ is toxic, corrosive and difficult to handle;
(2) $NH_3$ must be transported to the power plant;
(3) Unreacted $NH_3$ that may bypass the catalyst; (ammonia slippage) is a major concern.
(4) Most $NH_3$ based SCRs have an upper operating temperature of approximately 450° C. Higher operating temperatures cause the $NH_3$ to be oxidized to form NO; and
(5) In sulfur laden streams, $NH_3$ reacts with sulfur oxides to form ammonium sulfates which may corrode the exhaust pipes.

Until recently, no data was available to indicate that hydrocarbons could react selectively with NO under highly oxidizing conditions. It was found that instead of reacting with NO, the hydrocarbons would instead be consumed via oxidation reactions with the more abundant oxygen molecules. In the past few years, however, there has been a large number of published reports on the use of hydrocarbons for NO reduction in oxidizing environments.

In 1990, Hamada et al. published a letter entitled "Highly Selective Reduction of Nitrogen Oxides with Hydrocarbons over H-form Zeolite Catalysts in Oxygen-Rich Atmospheres", Applied Catalysis, Volume 64, 1990, pages L1–L4, indicating that some zeolites (especially H-ZSM-5 and H-mordenite) were observed to be active for the catalytic reduction of NO in 10% oxygen (optimal temperature approximately 400° C.) by using propane or propylene as a reducing species. In a following letter by Kintaichi et al., entitled "Selective Reduction of Nitrogen Oxides with Hydrocarbons over Solid Acid Catalysts in Oxygen-Rich Atmospheres" Catalysis Letters, Volume 6, 1990, pages 237–244, it was shown that NO can be reduced by propane over metal oxides (especially $Al_2O_3$). In 1991, Misono et al in an article entitled "Catalytic Removal of Nitrogen Monoxide over Rare Earth Ion-Exchanged Zeolites in the Presence of Propene and Oxygen", Chemistry Letters, 1991, pages 1001–1002, it was reported that Ce- and Pr-exchanged ZSM-5 and Y-type zeolites to be active for the catalytic reduction of NO with propylene in 2% oxygen (optimal temperature approximately 400° C.). Kikuchi et al. in an article entitled "Selective Reduction of NO with Propylene on Fe-silicate Catalysts", Chemistry Letters, 1991, pages 1063–1066 reported the catalytic reduction of NO with propylene over Fe-silicate catalysts. The focus of the Kikuchi et al study was to demonstrate that Fe-silicates were less susceptible to $SO_2$ poisoning than Cu-ZSM-5 at low temperatures (less than 400° C.). Hamada et al. in another letter entitled "Sulfate-promoted Metal Oxide Catalysts for the Selective Reduction of Nitrogen Monoxide by Propane in Oxygen-rich Atmosphere", Chemistry Letters, 1991, pages 2179–2182, reported that an active NO reduction catalyst (with propane) could be produced by pretreating $TiO_2$, $ZrO_2$, and $Fe_2O_3$ with sulfuric acid. Sato et al. in al article entitled "Cu-ZSM-5 Zeolite as Highly Active Catalysts for Removal of Nitrogen Monoxide from Emission of Diesel Engines", Applied Catalysis, Volume 70, 1991, pages L1–L5 reported that ethylene could be used for NO reduction over various cation exchanged zeolites. Ethylene was used because it was said to be the predominant hydrocarbon found in diesel emissions. In 2% oxygen, Sato's group measured NO conversion as a function of temperature for various cation (Cu, Co, H, Ag and Zn) exchanged ZSM-5 zeolites. It was found that the Cu-exchanged zeolite to be the most active at lower temperatures (approximately 250° C.).

Although the recent publications have shown that some hydrocarbons, such as propane, propene, or ethylene can be used as reducing species for the catalytic reduction of NO (to $N_2$), a more advantageous $NO_x$ reduction would be provided if methane ($CH_4$) or natural gas could be used as a reducing agent for $NO_x$ reduction under highly oxidizing environments found from stationary combustion sources.

It is apparent from the above that there exists a need in the art for a catalyst which does not use ammonia, and which at least equals the reduction characteristics of known catalysts. An attractive alternative is the use of methane or natural gas as the reducing agent instead of $NH_3$. It is a purpose of this invention to fulfill this and other needs in the art in a manner more apparent to the skilled artisan once given the following disclosure.

SUMMARY OF THE INVENTION

Generally speaking, this invention fulfills these needs by providing a selective catalytic reduction apparatus for the catalytic reduction of nitrogen monoxide, comprising a flow reactor having a gas inlet through which methane and a gas stream including $NO_x$ can be introduced into the flow reactor. A catalyst is disposed within the flow reactor whereby the methane reacts with the gas stream over the catalyst to catalytically reduce $NO_x$ in the gas stream. The catalyst comprises a zeolite impregnated with zinc and/or copper cations. In one example, the gas stream is introduced at a space velocity of approximately 22,000 $hr^{-1}$. Also, the selective catalytic reduction apparatus could be operated at temperatures exceeding 1000° F.

The preferred catalytic reduction, according to this invention, offers the following advantages: the use of methane; excellent catalytic reduction characteristics; ease of catalytic reduction; and good economy. In fact, in many of the preferred embodiments, these factors of use of natural gas, catalytic reduction characteristics and ease of catalytic reduction are optimized to an extent that is considerably higher than heretofore achieved in prior, known selective catalytic reduction apparatus.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several views and in which.

DETAILED DESCRIPTION OF THE INVENTION

Figure 1:
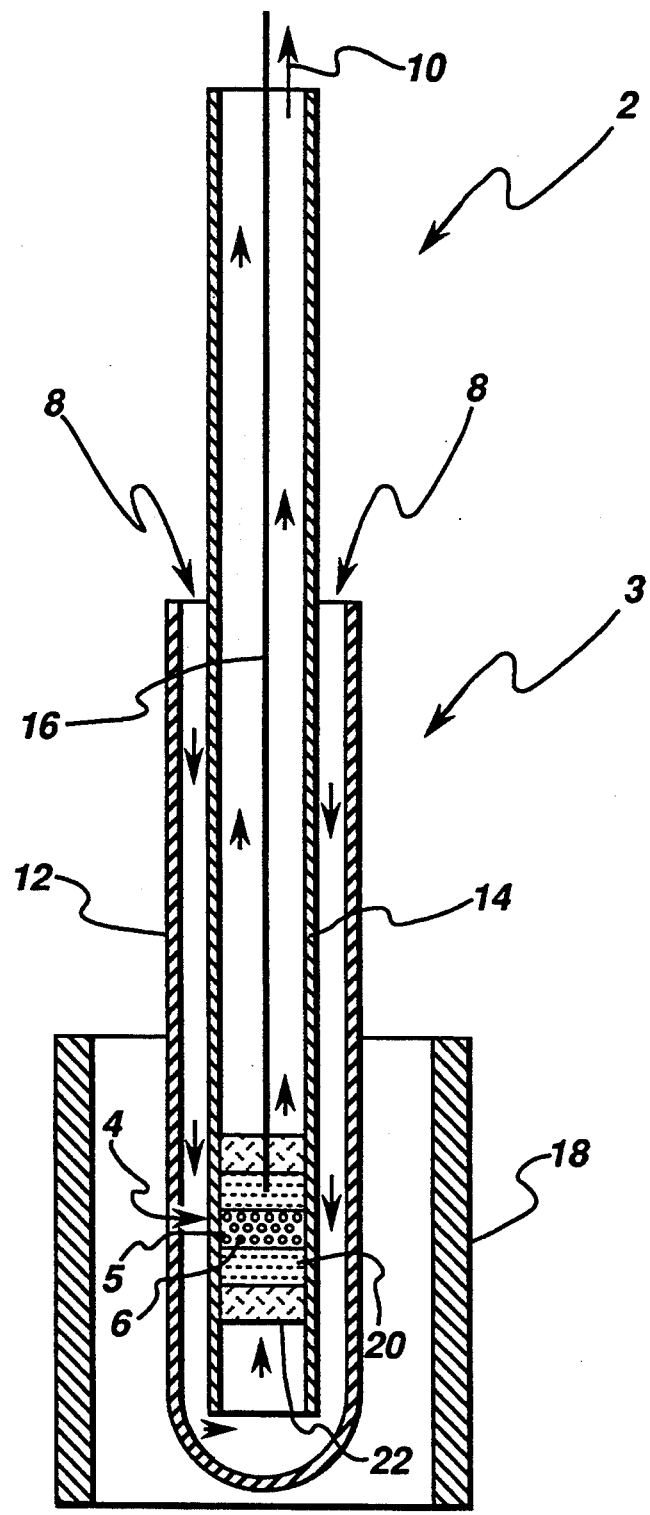
FIG. 1 is a schematic illustration of a selective catalytic reduction apparatus for the reduction of NO, according to the present invention.

With reference first to FIG. 1, there is illustrated $NO_x$ reduction apparatus 2. Apparatus 2 includes, in part, flow reactor 3, catalyst 4 having zeolite 5 and cations 6, gas stream inlet 8 such that the gas stream includes nitrogen oxide (NO), methane ($CH_4$) and oxygen $O_2$, and exhaust 10. Flow reactor 3 includes, in part, outer tube 12, inner tube 14, thermocouple 16 and heater 18. Outer tube 12 and inner tube 14, preferably, are constructed of quartz. Thermocouple 16, preferably, is a conventional high temperature resistant, sheathed type K thermocouple.

In order to make catalyst 4, the H-form of a conventional ZSM-5 zeolite 5 produced by Philadelphia Quartz of Philadelphia, Pa. is used as a starting material. A conventional impregnation process is used to exchange copper (Cu) and zinc (Zn) cations 6 into the zeolite 5 by impregnation of the zeolite material 5 in conventional solutions of cupric and zinc acetate, respectively. This impregnated zeolite 5 is then calcinated by conventional calcination techniques to approximately 600° C. (approximately 1100° F.) which produces a powdered catalyst 4. The catalyst 4 is then placed in the flow reactor 3. After catalyst 4 is placed in flow reactor 3, conventional alumina powder 20 and quartz wool 22 are packed around catalyst 4 by conventional packing techniques. Finally, a conventional heating element 18 is placed around the lower part of flow reactor 3 near catalyst 4.

During the operation of apparatus 2, inlet gas containing 90 ppm NO, 205 ppm $CH_4$, and 10.8% oxygen with the balance being nitrogen, is introduced into the flow reactor 3 along inlet 8. The space velocity was estimated to approximately 22,000 $hr^{-1}$ using a total flowrate of 70 sccm and approximately 0.17 grams of catalyst 4.

Figure 2:
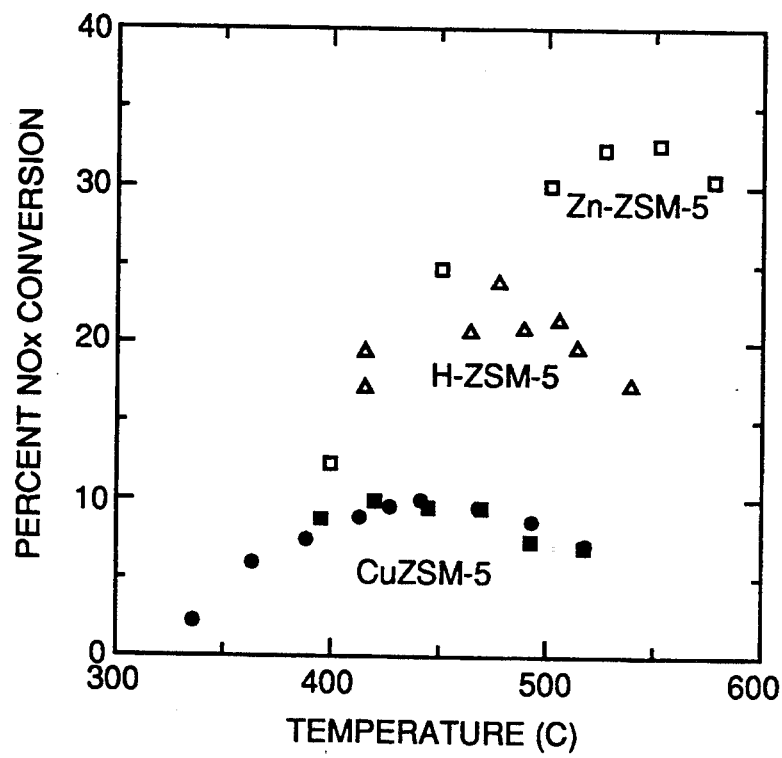
FIG. 2 is a graph showing the conversion of $NO_x$ over various cation exchange ZSM-5 zeolites with temperature in °C. plotted against percentage of $NO_x$ conversion.
Figure 3:
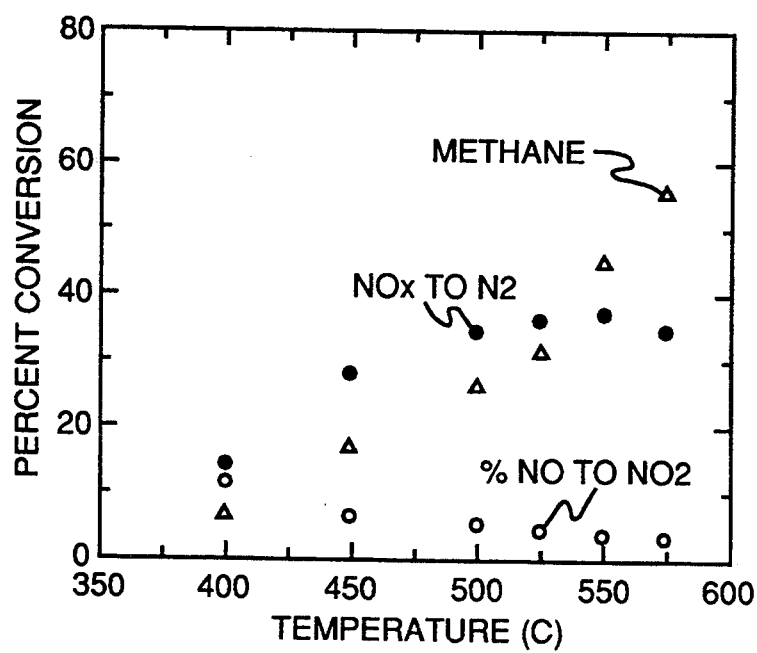
FIG. 3 is a graph showing conversions of $NO_x$ to $N_2$, NO to $NO_2$ and $CH_4$ over Zn-ZSM-5, with temperature in °C. plotted against percent conversion.

With respect to the use of methane for $NO_x$ reduction, FIGS. 2-5 demonstrate sample data. The conversion of $NO_x$ as a function of temperature has been plotted in FIG. 2 for the three zeolite samples tested (H-ZSM-5, Cu-ZSM-5, and Zn-ZSM-5). Using a conventional Beckman chemiluminescent $NO_x$ analyzer (model 955) for NO and $NO_x$ detection, FIG. 2 shows that a peak $NO_x$ conversion of approximately 25% was achieved with the H-ZSM-5 sample at 475° C. FIG. 2 also shows that by exchanging other cations into the ZSM-5 zeolite, the maximum $NO_x$ conversion and the optimal temperature needed to achieve the maximum $NO_x$ conversion could be varied.

For all three zeolite samples tested, NO conversion increased initially as the reactor temperature was increased, but then leveled off and eventually decreased at higher temperatures. It is believed that the decrease in NO conversion at high temperatures is due to the consumption of the reducing species, $CH_4$, via a competing reaction route (i.e., direct $CH_4$ oxidation). The conversions of NO and $CH_4$ over the Zn-ZSM-5 sample is plotted in FIG. 3 and show that the temperature at which NO conversion "peaks" corresponds to the temperature that $CH_4$ conversion increased rapidly (likely due to an alternate $CH_4$ reaction route).

Figure 4A:
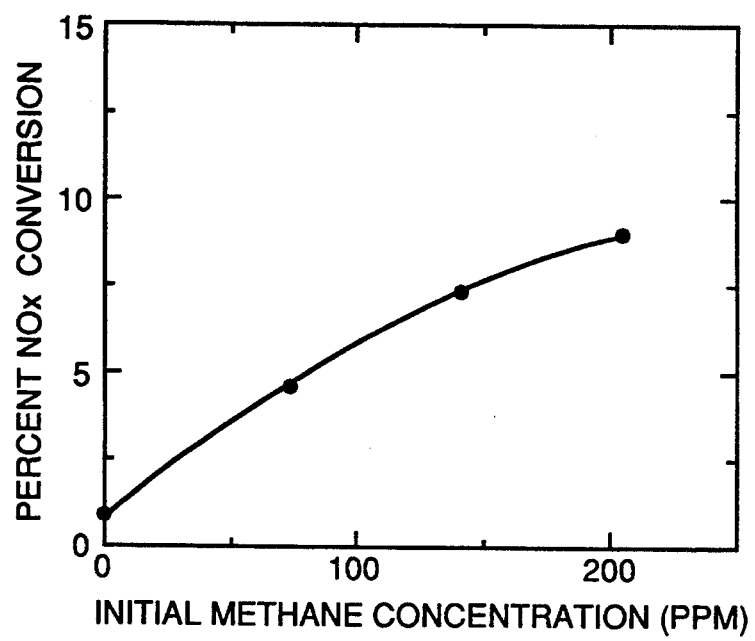
FIG. 4a is a graph showing the effect of initial methane conversion on $NO_x$ conversion with initial methane concentration in ppm plotted against percent $NO_x$ conversion.
Figure 4B:
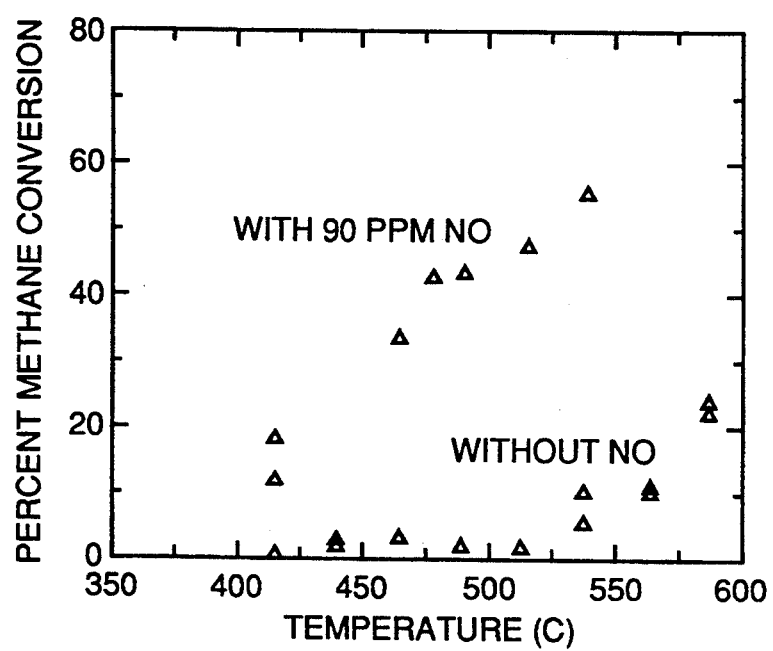
FIG. 4b is a graph showing the comparison of methane conversion with and without the presence of NO with temperatures in °C. plotted against percent methane conversion.
Figure 5:
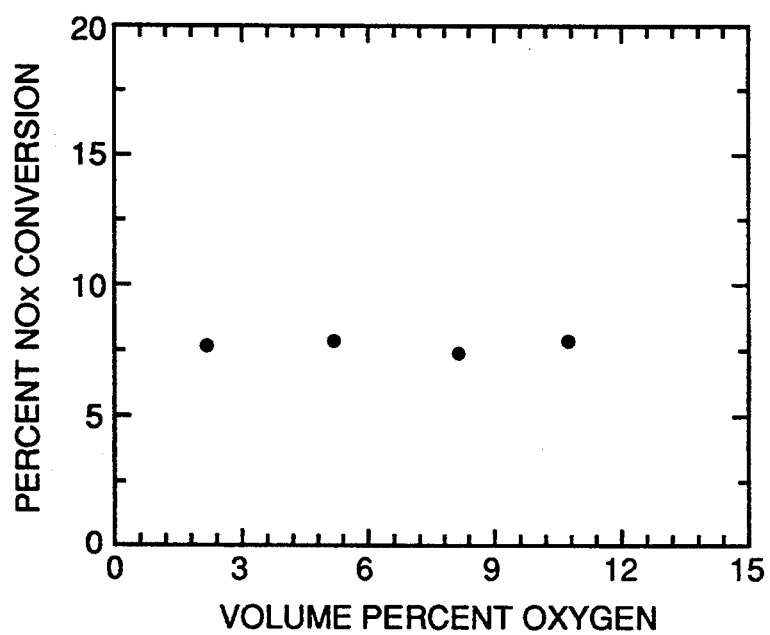
FIG. 5 is a graph showing the effect of oxygen concentration on $NO_x$ conversion with volume percent oxygen plotted against percent $NO_x$ conversion.

Data was also taken to demonstrate that the reaction between NO and $CH_4$ was highly selective. FIG. 4a clearly shows that no significant $NO_x$ conversion was measured if $CH_4$ were not present in the gas mixture while FIG. 4b shows that the conversion of $CH_4$ was delayed if NO were not present. Together, the data from FIGS. 4a and 4b indicate that both NO and $CH_4$ need to be present for either to react in appreciable quantities (the net reaction is selective). FIG. 4 shows that the conversion of NOx remains constant as the oxygen concentration is varied from 2.2 to 10.8%.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A method for selective catalytic reduction of $NO_x$ from a gas stream, said method comprising the steps of:
   providing a flow reactor having a catalyst disposed therein, said catalyst comprising a zeolite impregnated with zinc cations;
   introducing methane into said flow reactor; and
   introducing said gas stream into said flow reactor so that said methane reacts with said gas stream over said catalyst to catalytically reduce $NO_x$ in said gas stream.

2. The method of claim 1 wherein said zeolite is additionally impregnated with copper cations.

3. The method of claim 1 wherein said step of introducing said gas stream into said flow reactor comprises introducing said gas stream at a space velocity of approximately 22,000 $hr^{-1}$.

4. A selective catalytic reduction apparatus for the catalytic reduction of nitrogen monoxide, wherein said apparatus is comprised of:
   a catalyst means including an impregnated zeolite having a cation located substantially within said zeolite wherein said cation means are further comprised of zinc cations;

a flow reactor means such that said catalyst means is substantially located within said flow reactor means;

a gas stream having nitrogen monoxide operatively connected to said flow reactor means; and a methane gas means operatively connected to said flow reactor means such that said methane gas means and said catalyst substantially react with said gas stream to catalytically reduce said nitrogen monoxide in said gas stream.

5. The apparatus, as in claim 4, wherein said cation means are further comprised of:

copper cations.

6. An apparatus for the selective catalytic reduction of $NO_x$, said apparatus comprising:

a flow reactor having a gas inlet through which methane and a gas stream including $NO_x$ can be introduced into said flow reactor; and a catalyst disposed within said flow reactor, said catalyst comprising a zeolite impregnated with zinc cations, whereby said methane reacts with said gas stream over said catalyst to catalytically reduce $NO_x$ in said gas stream.

7. The apparatus of claim 6 wherein said zeolite is additionally impregnated with copper cations.

* * * * *